April 4, 1961  B. BARÉNYI  2,978,055
REINFORCING STRUCTURE FOR AUTOMOBILES WITH PANORAMA WINDSHIELDS
Filed Aug. 2, 1957  2 Sheets-Sheet 1

INVENTOR
BÉLA BARÉNYI

BY Dicke and Craig.

ATTORNEYS

2,978,055

REINFORCING STRUCTURE FOR AUTOMOBILES WITH PANORAMA WINDSHIELDS

Bela Barenyi, Stuttgart-Vaihingen, Germany, assignor to Daimler-Benz Aktiengesellschaft, Stuttgart-Unterturkheim, Germany Filed Aug. 2, 1957, Ser. No. 676,006

Claims priority, application Germany Aug. 4, 1956

1 Claim. (Cl. 180—78)

The present invention relates to new improvements in motor vehicles, and particularly in passenger cars, which are provided with so-called "panorama" windshields which are convexly curved as seen from the outside of the car and are enclosed by a frame.

It is the principal object of the present invention to provide a new supporting structure for the windshield portion of a car which allows the sides of a curved panorama windshield to be extended much further toward the rear than was previously possible so that the driver of the car will have a larger range of vision.

Another object of the present invention is to provide a transverse support for the windshield portion of a car, and particularly for one with a panorama windshield, which reinforces the lateral frame portions of the car bordering the windshield as well as the windshield itself.

A further object of the present invention is to provide a transverse support for the driver's compartment of a car within a plane directly underneath the windshield and between the windshield and the steering wheel which serves as a substantial reinforcement of the driver's compartment and as a strong shield for the protection of its occupants in the case of an accident.

Another object of the invention is to provide a transverse reinforcement of the type as described, the protective feature of which may be still further increased by making it of a resilient construction so as to serve as a shock absorber to reduce or soften the impact of the bodies of the occupants of the front seats when they are thrown forwardly in the event of a serious collision.

A further object of the invention is to provide such a transverse reinforcement in the form of a bracing member or hand rail which the occupant of the seat next to the driver may grasp to steady himself while riding over rough terrain or to brace himself during sudden stops or in a collision.

Another object of the present invention is to provide a transverse reinforcement of the type as described which may also serve as a support and reinforcement of the steering column of the car as well as a means for mounting the steering column and the steering wheel thereon so as to be adjustable in different lateral positions within the driver's compartment of a car.

In order to attain the above objects, the present invention provides a transverse reinforcing member within the driver's compartment of a car between the frame arms supporting the roof, and particularly near the corner between the curved upper portion and the substantially horizontal lower portion of each of these frame arms.

By means of such a reinforcing structure the considerable advantage will be attained that the rearmost edge portions of the windshield frame will be securely reinforced so that this rear edge may be placed much farther rearwardly than was previously possible. The lateral portions of the windshield may therefore likewise extend much farther rearwardly and thus increase the range of vision of the driver to a considerable extent. Such extension of the windshield was previously considered impossible in a closed car of reasonable safety to its occupants and adequate resistance against deformation of its body. The transverse member according to the present invention will therefore serve as a reinforcement of the windshield frame as well as a brace to increase the transverse stability of the car body and the strength of the door posts.

The transverse support according to the invention is preferably made of a hollow construction and may, if desired, be molded of steel plate. It may either have a straight axis or be curved, and if desired, it may be designed so that its cross-sectional area increases toward its center.

In order to provide the utmost protection in the event of a serious collision, the transverse support should be disposed as closely to the driver as possible. Such safety feature may be further improved by making the support of a resilient construction, and in addition it may be provided with a cover of a soft resilient material, for example, rubber. As already mentioned, further very important advantages will be attained if the transverse support is made in the form of a hand rail. Such a feature will serve particularly for the protection of the occupants of the front seat next to that of the driver.

Since it is the primary purpose of the transverse support to reinforce the narrow lateral frame portions of the car body which support the roof and also form the lateral ends of the windshield frame, and to compensate fully for the reduction in transverse stability of the upper portion of the car body which is due to the wide rearward expanse of the panorama windshield, it is very important that a secure connection be provided between the transverse support and the windshield frame. This may be attained by rigidly securing the ends of the support to the windshield frame, for example, by welding, or by bolting the support to the frame so that, if desired, the support may be removed.

According to the present invention, the transverse support preferably forms an element separate from the dashboard, and is disposed more closely to the driver than the latter and above the same. However, if desired, it may also be combined with the dashboard so that both together form a structural unit. If combined with the dashboard, the transverse support may be made of a shape closely following the shape of the lower edge of the windshield frame, while its outer connecting portions are made of a shape so as to comply as much as possible with the shape of the door post and the entrance opening. According to a preferred embodiment of the invention, the upper surface of the transverse support which is combined with the dashboard is made substantially level or slightly concave and preferably provided with a low rim so as to serve as a shelf on which items which should be easily accessible to the driver or the occupant of the other front seat, such as road maps, cigarettes, sun glasses or the like, may be deposited. Instead of being combined with the dashboard along the entire width of the latter, the transverse support may, however, also be combined with the dashboard only along a part of its length or by means of straps or the like, even though both parts together are preferably designed to form a single structural unit which is removably secured to the frame of the windshield so as to permit both of them together to be installed in or removed from the car as one piece.

According to the invention, the transverse support may also serve as a support of the steering column of the car and as a means for adjusting the position of the steering column in a lateral direction within the driver's compartment.

Further objects, features, and advantages of the present invention will be apparent from the following detailed description thereof, particularly when read with reference to the accompanying diagrammatical drawings, in which—

Fig. 7 shows a partial plan view of a car provided with a transverse support which is tapering from the center toward its outer ends and also serves as a support for mounting a control unit of the car thereon; while

Figure 1:
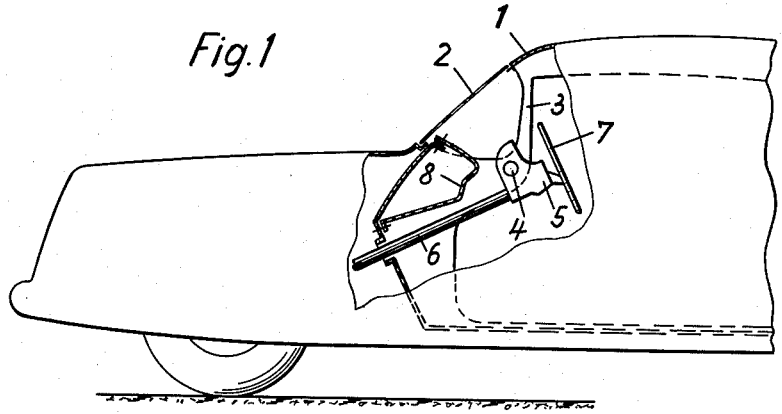
Fig. 1 shows a partial longitudinal cross section of the front portion of a car which according to one embodiment of the present invention is provided with a transverse support mounted independently of the dashboard.

Referring to the drawings in which similar reference numerals designate similar parts, the car body 1 to which the present invention may be applied may be of any suitable design. Its top portion terminates at the front end in a panorama windshield 2 of a convex curvature as seen from the outside. The edges of this windshield 2 are embedded in a frame 3 of a suitable construction and a corresponding convex curvature.

According to the embodiment of the invention illustrated in Fig. 1, the frame 3 includes two laterally disposed side walls which are formed essentially of two arms, one of which being disposed essentially vertically while the other arm is disposed essentially horizontally and both arms extending from a common corner. A tubular cross bar 4 is mounted between the side walls of the frame 3 and secured at each corner, for example, by being welded thereto. Crossbar 4 also serves as the support of a control unit 5 of the car which, in turn, supports the steering column 6 with the steering wheel 7 thereon. In this embodiment of the invention, the dashboard 8 of the car which is mounted on the front wall of the car body may be of a conventional design and form an element separate and spaced from cross bar 4.

Figure 2:
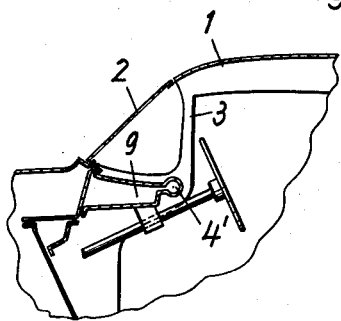
Fig. 2 shows a similar cross section of a car in which the transverse support is combined with the dashboard.

The embodiment of the invention illustrated in Fig. 2 differs from that shown in Fig. 1 primarily by the fact that dashboard 9 is of a consolelike shape and directly connected to and supported by the crossbar 4', for example, by means of webs or straps.

Figure 3:
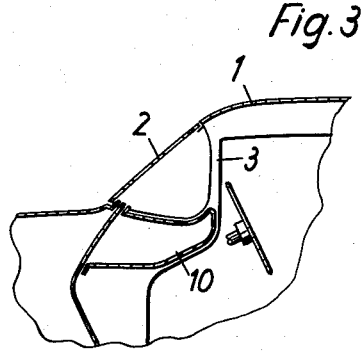
Fig. 3 shows another longitudinal cross section of a car in which the transverse support is combined with the dashboard to form a one-piece unit.

In the further modification of the invention as shown in Fig. 3, the dashboard and the crossbar are combined to form a single integral unit 10 which may be made, for example, of steel plate. This unit 10 is designed so as to comply with the shape of the lower edge of windshield 2, while its outer ends should comply as closely as possible with the shape of the door post and the entrance opening. Its upper surface is preferably made slightly concave and may serve as a shelf. Since such shelf extends rearwardly to a point quite close to the driver and the occupant of the other front seat, any articles deposited thereon will be within easy reach. The rear edge of unit 10 is preferably raised above the shelf surface and prevents the articles on the shelf from falling off. This rear edge may also be designed so as to serve for an additional function of the tubular crossbar 4 of the embodiments previously described, namely, to serve as a hand rail which the occupant of the seat next to the driver may grasp either to steady himself while driving over rough ground or to brace himself during sudden stops or in the event of a collision so as to protect himself from being thrown forwardly against the windshield. In comparison with the conventional design of the driver's compartment in which the dashboard is spaced a considerable distance from the normal reclined sitting position of the person next to the driver and where such person in such position can brace himself only by pressing his feet against the floor boards and thus his back against the back of the seat, this feature of the invention has a very important safety value. Such person may now sit much more relaxed, knowing that in the event of a sudden stop or a collision he can immediately and safely brace himself against being thrown forwardly.

Figure 4:
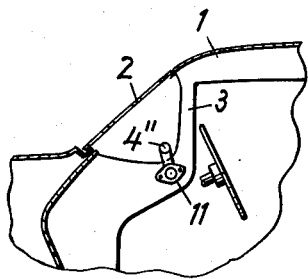
Fig. 4 shows a partial side view of a car with a tubular transverse support according to the invention.
Figure 5:
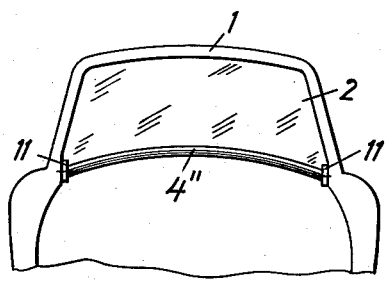
Fig. 5 shows a transverse cross section of Fig. 4.
Figure 6:
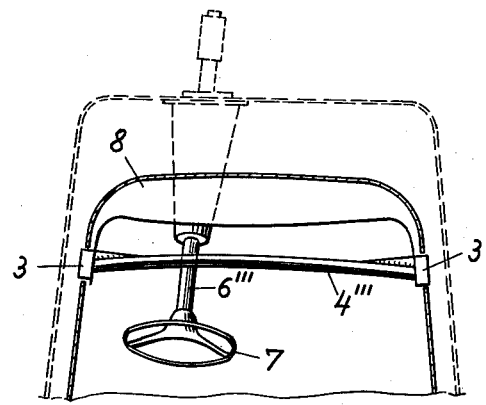
Fig. 6 shows a partial plan view of a car provided with a tubular transverse support separate from the steering column.

Figs. 4 and 5 illustrate a removable connection of a curved tubular crossbar 4" to the windshield frame 3. Each outer end of crossbar 4" has a flange 11 rigidly secured thereto which is then secured to frame 3 by means of bolts. Crossbar 4" may, however, also be rigidly welded to frame 3, as indicated in Fig. 6. In this embodiment of the invention, the steering column 6''' with steering wheel 7 thereon is not secured to crossbar 4''', and the dashboard 8 also forms an element separate from cross bar 4''' and is mounted in the usual manner on the car body.

Figure 7:
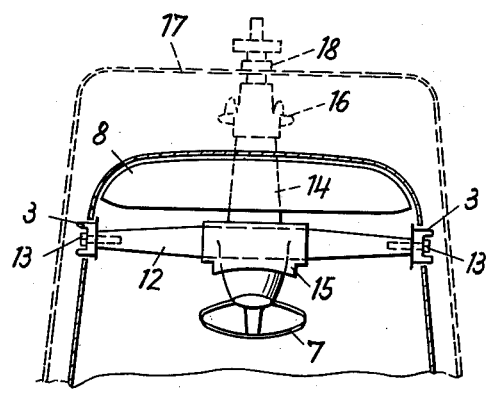

Fig. 7 illustrates a crossbar 12 with a straight axis which is secured to the windshield frame 3 by being provided with an axially extending bore in each end into which a bolt 13 extending through frame 3 is screwed. Crossbar 12 is in this case illustrated as being of a double-conical shape and supporting a control unit 15 at its thickest central portion. If the car is of the type in which the steering column 14 and the steering wheel 7 thereon are centrally disposed within the driver's compartment, as shown in Fig. 7, control unit 5 may include steering column 14, control instruments 15, and suspension pedals 16 mounted on steering column 14. The front end of this control unit 14, 15 may be resiliently mounted on the front wall 17 of the car body, for example, by means of a rubber ring 18, while the dashboard 8 may be removably mounted within the front part of the driver's compartment.

Figure 8:
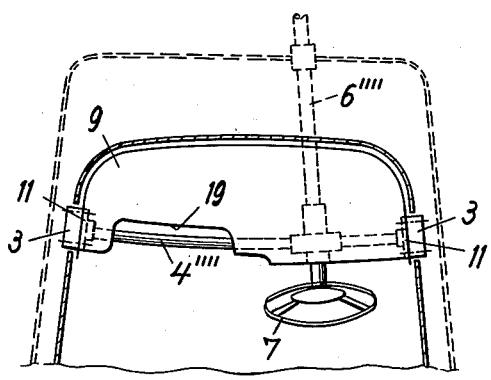
Fig. 8 shows a partial plan view of a car provided with a transverse support which is connected to the dashboard.

Fig. 8 finally illustrates the tubular crossbar 4'''' as being slightly curved toward the driver and provided with flanges 11 on its outer ends at which the crossbar is bolted to the windshield frame 3. Dashboard 9 is preferably combined with crossbar 4'''' so that both together form a single structural unit with crossbar 4'''' extending through the dashboard compartment. However, dashboard 9 is preferably provided with a recess 19 at the side of the passenger next to the driver so that crossbar 4'''' will at this place be free and permit the passenger to grasp the same. Steering column 6'''' is again suspended in a suitable manner on crossbar 4''''. If, however, the curved crossbar 4'''' according to Fig. 8 forms an element separate from dashboard 9, it will also permit the steering column 6'''' to be adjusted thereon in a lateral direction to the position most suitable to the driver.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

In a motor vehicle having a panorama windshield of a convex curvature as seen from the outside, a dashboard, and a control unit including a steering column, control instruments, and suspension pedals, said control unit being independent of said dashboard, a frame enclosing said windshield including side walls connected with the roof of said vehicle and disposed at each end of said windshield, said side walls comprising arm portions disposed essentially perpendicular to each other to thereby form a corner at each end of said windshield, one of said arms being disposed essentially horizontally, a transverse supporting member intermediate said side walls and removably secured thereto at each of said corner portions, the cross-sectional area of said transverse member increasing toward the center thereof from each end, and means for securing said control unit to said transverse supporting member.

References Cited in the file of this patent

UNITED STATES PATENTS

| | | |
|---|---|---|
| 1,387,147 | Ford | Aug. 9, 1921 |
| 1,543,819 | Belden | June 30, 1925 |
| 1,818,734 | Moesta | Aug. 11, 1931 |
| 2,070,760 | Straith | Feb. 16, 1937 |
| 2,072,655 | Tjaarda | Mar. 2, 1937 |
| 2,253,193 | Niessen | Aug. 19, 1941 |
| 2,720,932 | Arpels | Oct. 18, 1955 |
| 2,798,737 | Sundlof | July 9, 1957 |